US011674582B2

(12) United States Patent
Ono et al.

(10) Patent No.: US 11,674,582 B2
(45) Date of Patent: Jun. 13, 2023

(54) DIFFERENTIAL DEVICE

(71) Applicant: AISIN CORPORATION, Kariya (JP)

(72) Inventors: Hiroyuki Ono, Aichi (JP); Yusuke Suzuki, Aichi (JP)

(73) Assignee: AISIN CORPORATION, Kariya (JP)

( * ) Notice: Subject to any disclaimer, the term of this patent is extended or adjusted under 35 U.S.C. 154(b) by 445 days.

(21) Appl. No.: 16/620,592

(22) PCT Filed: Aug. 27, 2018

(86) PCT No.: PCT/JP2018/031522
§ 371 (c)(1),
(2) Date: Feb. 2, 2020

(87) PCT Pub. No.: WO2019/044749
PCT Pub. Date: Mar. 7, 2019

(65) Prior Publication Data
US 2022/0196131 A1 Jun. 23, 2022

(30) Foreign Application Priority Data

Aug. 31, 2017 (JP) .............................. JP2017-168088

(51) Int. Cl.
*F16H 48/40* (2012.01)
*F16H 48/38* (2012.01)
(52) U.S. Cl.
CPC ....... *F16H 48/40* (2013.01); *F16H 2048/382* (2013.01); *F16H 2048/385* (2013.01)
(58) Field of Classification Search
None
See application file for complete search history.

(56) References Cited

U.S. PATENT DOCUMENTS 8,015,899 B2 *  9/2011 Gianone ............. B23K 33/006
                                                  74/606 R
10,281,022 B2 * 5/2019 Annigeri ................. F16H 48/40
(Continued)

FOREIGN PATENT DOCUMENTS

DE    102008000444 A1 * 9/2009 ............. F16H 48/08
JP       2010-174924 A    8/2010
(Continued)

OTHER PUBLICATIONS

International Search Report for PCT/JP2018/031522 dated Nov. 13, 2018 [PCT/ISA/210].

*Primary Examiner* — Ernesto A Suarez
*Assistant Examiner* — James J Taylor, II
(74) *Attorney, Agent, or Firm* — Sughrue Mion, PLLC (57) ABSTRACT

A differential device includes a differential case (10) that has a flange portion (11) and a differential ring gear (40) that has a tooth portion, a fixed and supported portion (45), and a coupling portion. The differential case (10) has a first abutting surface (10a) and a restricting portion (10b). The differential ring gear (40) has a second abutting surface (40a) and an abutting portion (40b). A welding portion that is formed by welding the flange portion (11) of the differential case (10) and the fixed and supported portion (45) of the differential ring gear (40) is disposed at a position that is different from an abutting part between the first abutting surface (10a) and the second abutting surface (40a) and an abutting part between the restricting portion (10b) and the abutting portion (40b).

6 Claims, 6 Drawing Sheets

(56) References Cited

U.S. PATENT DOCUMENTS

| | | | |
|---|---|---|---|
| 2011/0319220 A1 | 12/2011 | Shioiri et al. | |
| 2013/0195545 A1* | 8/2013 | Tsuchida | F16H 55/17 |
| | | | 403/270 |
| 2016/0290466 A1* | 10/2016 | Yanase | F16H 48/40 |
| 2022/0260147 A1* | 8/2022 | Uchida | F16H 48/40 |

FOREIGN PATENT DOCUMENTS

| | | | |
|---|---|---|---|
| JP | 2011-117540 A | | 6/2011 |
| JP | 5614054 B2 | | 10/2014 |
| JP | 5687577 B2 | * | 3/2015 |

* cited by examiner

DIFFERENTIAL DEVICE

CROSS REFERENCE TO RELATED APPLICATIONS

This application is a National Stage of International Application No. PCT/JP2018/031522, filed Aug. 27, 2018, claiming priority to Japanese Patent Application No. 2017-168088, filed Aug. 31, 2017.

TECHNICAL FIELD

The technique relates to a differential device installed in a vehicle etc.

BACKGROUND ART

Conventionally, a differential device is installed in a vehicle etc. so as to absorb a rotational difference between left and right wheels when turning or to absorb a rotational difference between front wheels and rear wheels, for example. In general, the differential device is configured to input a rotation output from a speed change mechanism to a differential ring gear, transmit the rotation from the differential ring gear to a differential case that houses a differential mechanism, and transmit the rotation to a pair of output members while absorbing a differential rotation of the output members with the differential mechanism.

When manufacturing the above differential device, the differential case and the differential ring gear are formed separately and then the two are integrally fixed. When the differential case and the differential ring gear are fastened by a bolt etc., the size is increased to ensure the strength, which prevents weight reduction. Thus, a method of fixing the differential case and the differential ring gear by welding is proposed (see Patent Document 1, for example).

In a differential device of Patent Document 1, a differential ring gear formed of a helical gear is fitted to a differential case in an axial direction so as to be abutted against the differential case, and welding is performed on an abutting portion. The disclosure proposes that when a thrust force is generated in the differential ring gear in conjunction with a transmission of a driving force, the abutting portion receives the thrust force, the stress is less likely to be generated in a welding portion and the welding portion is thus suppressed from being damaged.

RELATED ART DOCUMENTS

Patent Documents

Patent Document 1: Japanese Unexamined Patent Application Publication No. 2010-174924 (JP 2010-174924 A)

SUMMARY OF THE DISCLOSURE

Problem to be Solved by the Various Aspects of the Disclosure

There is a problem in which if a position accuracy of the differential ring gear with respect to the differential case is not satisfactory, the meshing in the differential ring gear is not satisfactory and the gear noise is increased. As in the case of Patent Document 1, there is a case in which a distance in an inner/outer peripheral direction of the differential ring gear is long due to the layout of a speed change mechanism and the differential device. That is, the differential device of Patent Document 1 is configured so that there is a distance between a tooth surface of the differential ring gear and a portion that is fixed to and supported by the differential case, in the inner/outer peripheral direction. Since the outer peripheral side of the abutting portion is welded as described above, the welding portion is pulled towards the differential case side due to solidification contraction after welding is performed. Thus, the differential ring gear is easily inclined with the abutting portion on the inner peripheral side serving as a fulcrum, the position accuracy of the differential ring gear becomes unsatisfactory, and the gear noise is increased, which is a problem.

An aspect of the disclosure is to provide a differential device in which a position accuracy of a differential ring gear after welding is made satisfactory so that it is possible to prevent a gear noise from being increased, even when a distance between a tooth portion and a fixed and supported portion is long.

Means for Solving the Problem

The differential device includes:
a differential case that houses a differential mechanism that is drivingly coupled to an output shaft; and
a differential ring gear that has a tooth portion provided with a tooth surface on an outer peripheral side, a fixed and supported portion that is disposed on an inner peripheral side of the tooth portion and that is fixed to and supported by an outer peripheral side of the differential case, a coupling portion that is formed so as to have a plate shape having a thickness that is shorter than a length of the tooth portion in an axial direction and that couples the tooth portion and the fixed and supported portion, the differential ring gear being welded on the outer peripheral side of the differential case, wherein
the differential case includes:
a first abutting surface that is disposed so as to extend in the axial direction;
a restricting portion that restricts movement of the differential ring gear abutted against the first abutting surface toward one side in the axial direction; and
a flange portion that extends in a flange shape on an opposite side of the first abutting surface from the restricting portion in the axial direction toward the outer peripheral side,
the differential ring gear includes:
a second abutting surface that is disposed on an inner peripheral side of the fixed and supported portion and that is abutted against the first abutting surface in the axial direction; and
an abutting portion that is disposed on a side of the fixed and supported portion, that is extended in a radial direction, and that is configured to be abutted against the restricting portion, and
a welding portion that is formed by welding the flange portion of the differential case and the fixed and supported portion of the differential ring gear is disposed at a position that is different from an abutting part between the first abutting surface and the second abutting surface and an abutting part between the restricting portion and the abutting portion.

With the differential device, a distance in an inner/outer peripheral direction of the differential ring gear is long, in which the tooth portion of the differential ring gear and the fixed and supported portion are coupled via the coupling portion. However, the flange portion of the differential case and the fixed and supported portion of the differential ring gear are welded at a position that is different from the abutting part between the first abutting surface and the second abutting surface and the abutting part between the restricting portion and the abutting portion. When solidification contraction occurs after welding, it is thus possible to suppress the differential ring gear from being inclined due to the deformation of the flange portion. It is also possible to satisfactorily maintain the position accuracy of the differential ring gear after welding and therefore prevent the gear noise from increasing.

DETAILED DESCRIPTION

Figure 1:
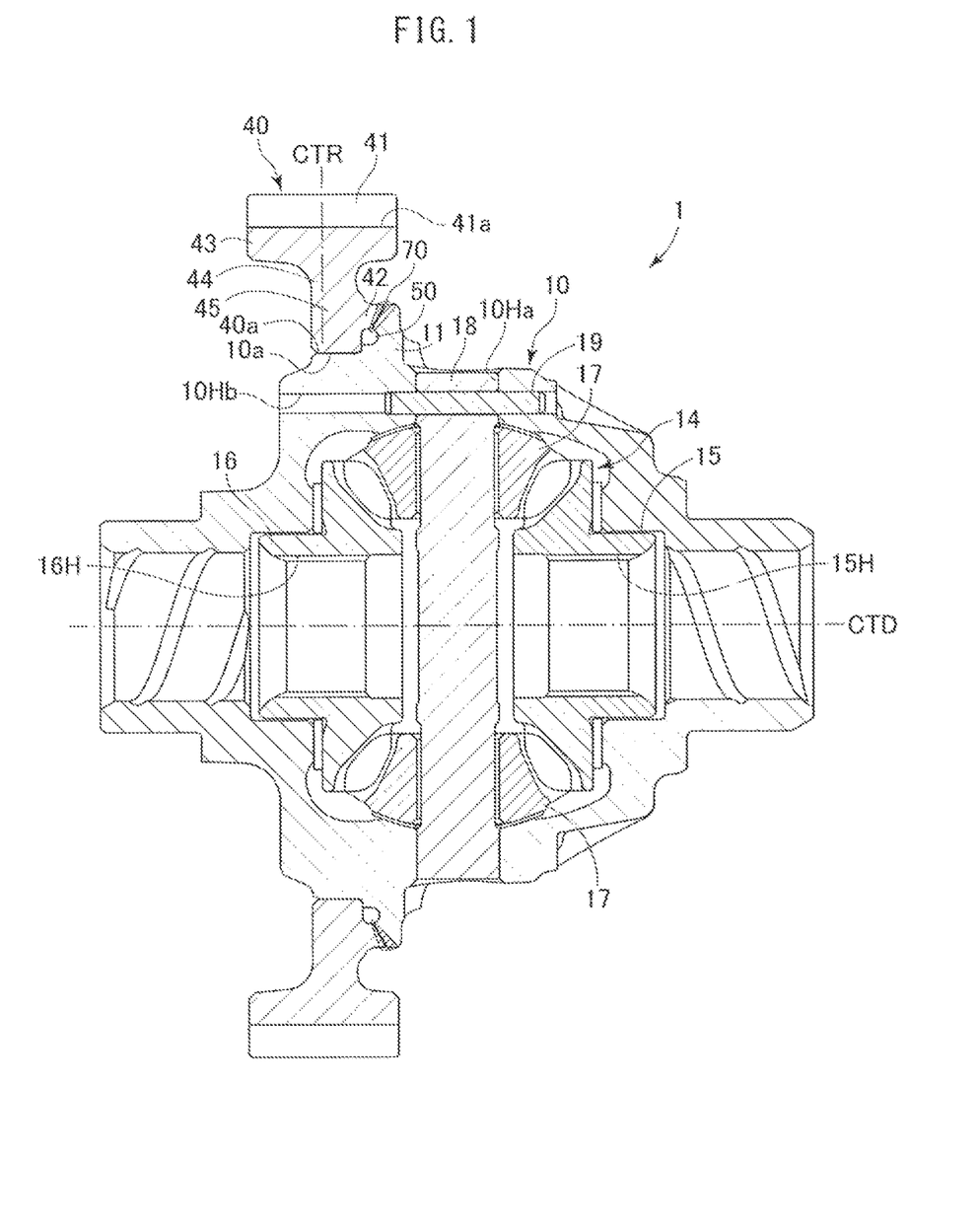
FIG. 1 illustrates a sectional view of a differential device according to an embodiment.
Figure 2:
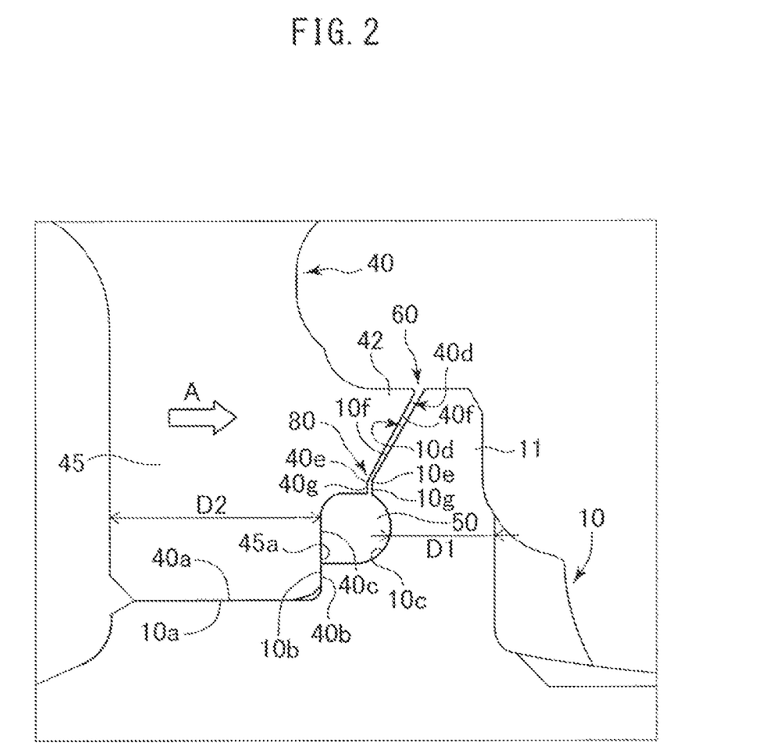
FIG. 2 illustrates an enlarged sectional view of an assembling portion of a differential case and a differential ring gear according to the embodiment.
Figure 3:
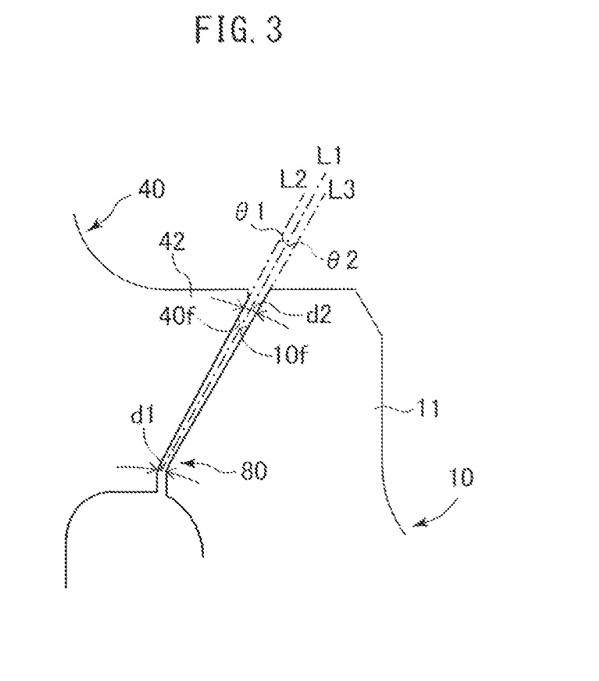
FIG. 3 illustrates an enlarged sectional view of a separation portion according to the embodiment.
Figure 4:
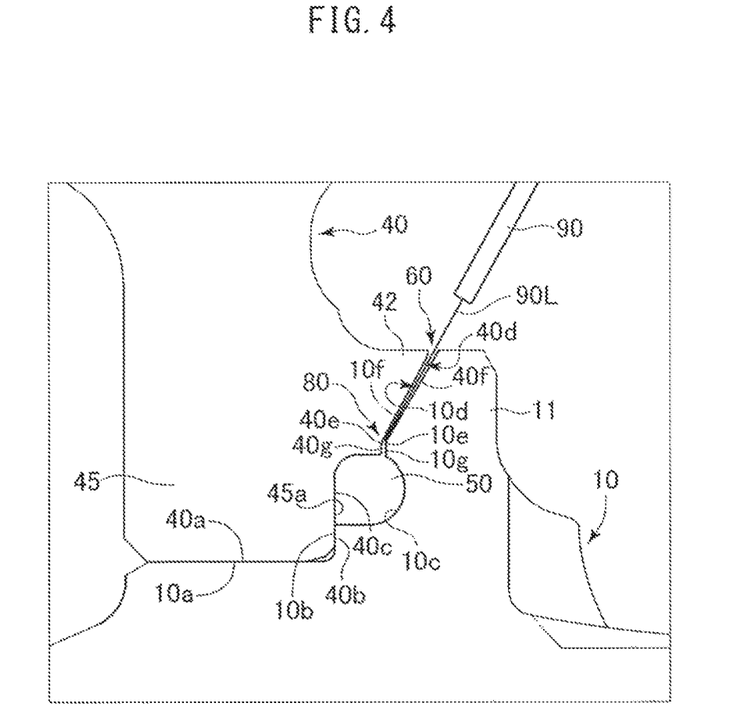
FIG. 4 illustrates an enlarged sectional view of the differential case and the differential ring gear during welding according to the embodiment.
Figure 5:
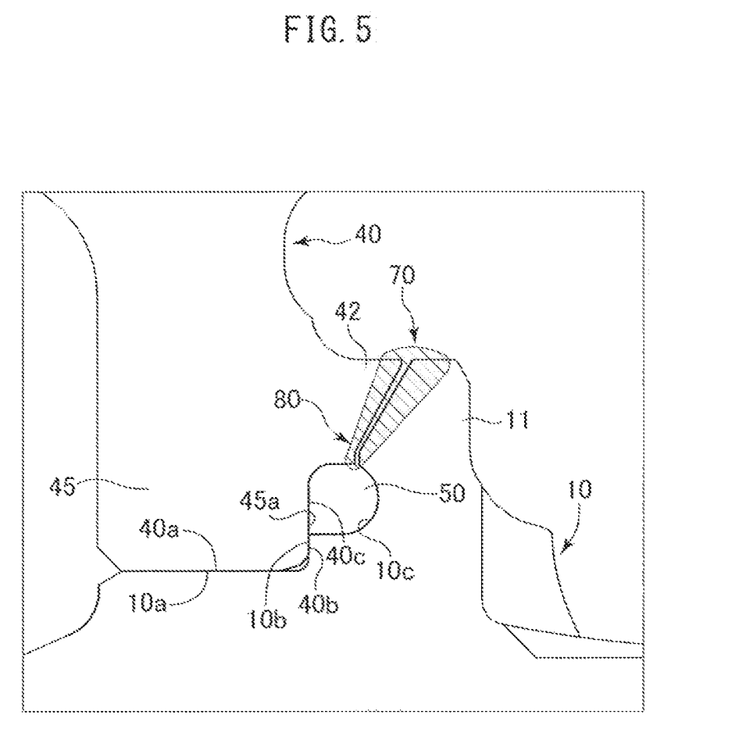
FIG. 5 illustrates an enlarged sectional view of a welding portion of the differential case and the differential ring gear after welding according to the embodiment.
Figure 6:
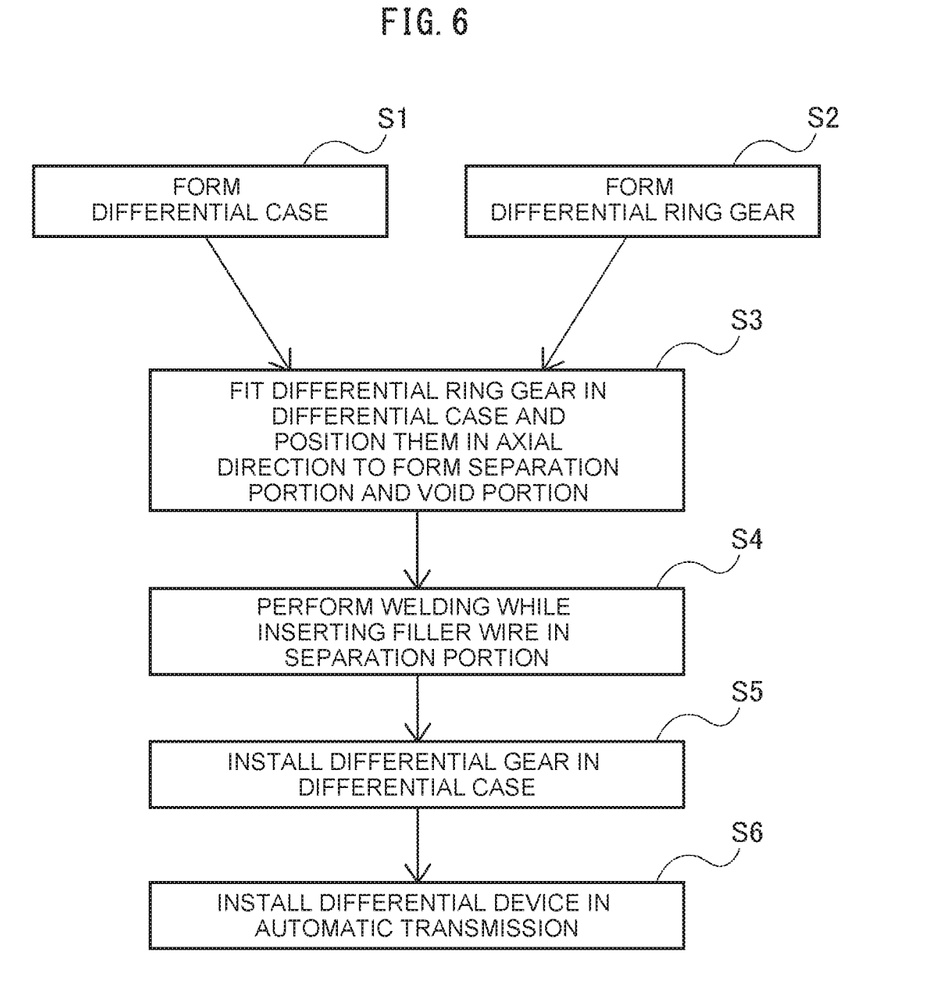
FIG. 6 illustrates a flowchart of a manufacturing process of the differential device according to the embodiment.

Hereinafter, a differential device according to an embodiment will be described with reference to FIGS. 1 to 6. FIG. 1 illustrates a sectional view of a differential device according to the embodiment. FIG. 2 illustrates an enlarged sectional view of an assembling portion of a differential case and a differential ring gear according to the embodiment. FIG. 3 illustrates an enlarged sectional view of a separation portion according to the embodiment. FIG. 4 illustrates an enlarged sectional view of the differential case and the differential ring gear during welding according to the embodiment. FIG. 5 illustrates an enlarged sectional view of a welding portion of the differential case and the differential ring gear after welding according to the embodiment. FIG. 6 illustrates a flowchart of a manufacturing process of the differential device according to the embodiment.

[Overall Structure of Differential Device]

A differential device 1 according to the embodiment is provided in an automatic transmission (not shown) that is installed in a vehicle, such as an FF (front engine, front drive) type vehicle, in which an engine output shaft is arranged laterally with respect to a vehicle traveling direction. The differential device 1 is configured so that a rotation from a counter shaft of a speed change mechanism of the automatic transmission is shifted by the speed change mechanism and is transmitted to a differential ring gear 40 described below.

Specifically, as illustrated in FIG. 1, the differential device 1 is configured to include the differential ring gear 40, a differential case 10 to which the differential ring gear 40 is fixed, and a differential mechanism 14 housed in the differential case 10, in general. The differential ring gear 40 is formed to have a cylindrical shape in which a center is a center CTD of left and right drive shafts in an axial direction, the left and right drive shafts being output shafts not shown. The differential ring gear 40 is configured to include a tooth portion 43 provided with a tooth surface 41 on an outer peripheral side, a fixed and supported portion 45 that is fixed to and supported by an outer peripheral side of the differential case 10, a coupling portion 44 that couples the tooth portion 43 and the fixed and supported portion 45. On the fixed and supported portion 45, an extending portion 42 that protrudes from a side face 45a (see FIG. 2) so as to extend in an axial direction is formed. The differential ring gear 40 is thus formed by the tooth portion 43, the coupling portion 44, and the fixed and supported portion 45 so as to have a T shape in a sectional view.

The tooth surface 41 described above is formed of a helical gear, configured so as to mesh with a counter shaft not shown, and configured so that a tooth bottom 41a that is recessed between a plurality of teeth is at a position that is on an innermost peripheral side. The tooth surface 41 after the differential ring gear 40 and the differential case 10 are fixed is positioned so that the center CTR in the axial direction overlaps with a second abutting surface 40a described below in the axial direction when viewed in a radial direction. The tooth surface 41 is configured so that even when a thrust force in the axial direction acts on the tooth surface 41, the differential ring gear 40 can be suppressed from being inclined. The differential ring gear 40 is welded at a welding portion 70 described in detail below so that the differential ring gear 40 is integrally fixed to the differential case 10.

The differential case 10 is configured as a hollow cylindrical case that houses the differential mechanism 14. The differential case 10 is configured including, in an upper part not shown, an opening portion that allows the differential mechanism 14 to be installed. On an outer peripheral side of the differential case 10, a flange portion 11 is formed so as to extend toward the outer peripheral side in a flange shape so as to face the differential ring gear 40. In the differential case 10, a bearing not shown is interposed between the differential case 10 and a case of an automatic transmission, that is, the differential case 10 is supported so as to be rotatable with respect to the case of the automatic transmission.

The differential mechanism 14 described above is configured including a pinion shaft 18 that is inserted in a shaft hole 10Ha and that is retained by a pin 19 inserted in a pin hole 10Hb, two pinion gears 17 that are supported by the pinion shaft 18 so as to be rotatable, and side gears 15, 16 serving as a pair of output members that each mesh with the pinion gears 17. The side gears 15, 16 are each supported by the differential case 10 so as to be rotatable. The side gears 15, 16 are provided with fitting holes 15H, 16H to which a driveshaft not shown is fitted, that is, the side gears 15, 16 are drivingly coupled to the left and right wheels via the drive shaft.

In the differential device 1 configured as described above, the differential ring gear 40 is integrally fixed and coupled to the differential case 10. Thus, when the differential ring gear 40 receives an input of rotation, the differential case 10 rotates as it is and the pinion shaft 18 is rotated integrally with the differential case 10. As well as causing the pinion gears 17 to revolve, the pinion shaft 18 absorbs a differential rotation while rotating with the pinion shaft 18 as the center when a differential rotation is generated in the side gears 15, 16. The pinion shaft 18 accordingly transmits the revolution of the pinion gears 17 to the side gears 15, 16. In this way, the rotation is transmitted to the left and right wheels via the drive shaft not shown.

[Detailed Configuration of Assembling Portion of Differential Case and Differential Ring Gear]

As illustrated in FIG. 2, on the outer peripheral side of the differential case 10, a first abutting surface 10a, a restricting portion 10b, a first facing surface (side surface) 10c, and a first welding surface 10d are formed, in general. The first abutting surface 10a is formed as a circumferential surface extending in the axial direction. A second abutting surface 40a of the differential ring gear 40 described below is fitted to the first abutting surface 10a by press fitting. The restricting portion 10b is extended linearly from an end portion of the first abutting surface 10a toward the outer peripheral side in the radial direction so as to be perpendicular to the axial direction. The restricting portion 10b is formed in a stepped shape from the first abutting surface 10a. In this way, the restricting portion 10b restricts the differential ring gear 40 from moving toward one side in the axial direction when an abutting portion 40b of the differential ring gear 40 described below abuts against the restricting portion 10b.

The first facing surface 10c and the first welding surface 10d are formed on the flange portion 11 that extends in a flange shape toward the outer peripheral side, on the opposite side of the restricting portion 10b from the first abutting surface 10a. The first welding surface 10d is positioned at a distal end portion of the flange portion 11. The first welding surface 10d is formed so as to extend along an entire circumference in the circumferential direction and face the radial direction. That is, the first welding surface 10d is formed so as to extend inclined with respect to the radial direction that is perpendicular to the axial direction, and so that the surface faces the outer peripheral side. The first welding surface 10d is positioned so as to face the second welding surface 40d of the differential ring gear 40 described below. The first welding surface 10d is formed so as to include a first planar portion 10f, a first bent portion 10e, and a first end portion planar surface 10g. The first planar portion 10f has a planar shape and is provided on an upstream side of the first welding surface 10d in an irradiating direction of a laser described below, that is, on the outer peripheral side of the first welding surface 10d. The first bent portion 10e is provided on a downstream side of the first planar portion 10f in the irradiating direction of the laser, that is, on the inner peripheral side of the first planar portion 10f, and is bent in the radial direction that is perpendicular to the axial direction with respect to the first planar portion 10f. The first end portion planar surface 10g is provided on the inner peripheral side of the first bent portion 10e and extends in a planar shape in the radial direction that is perpendicular to the axial direction. The first end portion planar surface 10g forms an end portion on the inner peripheral side of the first welding surface 10d.

The first facing surface 10c is formed on a side surface of the flange portion 11 on the first abutting surface 10a side and the restricting portion 10b side in the axial direction. The first facing surface 10c is provided so as to extend along the entire circumference in the circumferential direction on the inner peripheral side with respect to the first welding surface 10d and so as to be on the inner side of the flange portion 11 in the axial direction. The first facing surface 10c is formed so as to be recessed in an arc shape from the end portion on the inner peripheral side of the first welding surface 10d toward the inner side of the flange portion 11. The first facing surface 10c is positioned so as to face a second facing surface 40c of the differential ring gear 40 described below.

In the fixed and supported portion 45, the differential ring gear 40 is provided with the second abutting surface 40a, the abutting portion 40b, the second facing surface 40c, and the second welding surface 40d, in general. The second abutting surface 40a is formed on an inner peripheral side of the fixed and supported portion 45 and is abutted against the first abutting surface 10a of the differential case 10 described above. The abutting portion 40b is formed by a part of the side face 45a of the fixed and supported portion 45 on the differential case 10 side. The abutting portion 40b is formed on the immediate outer peripheral side of the second abutting surface 40a in a part on the inner peripheral side so as to extend along the entire circumference in the circumferential direction and extend in the radial direction that is perpendicular to the axial direction.

The second facing surface 40c is a surface that faces the first facing surface 10c so as to define a void 50 as described in detail below. The second facing surface 40c is formed by another part of the side face 45a of the fixed and supported portion 45 on the differential case 10 side other than the abutting portion 40b described above. That is, the second facing surface 40c has a planar shape that is continuous with the abutting portion 40b and is positioned on the outer peripheral side of the abutting portion 40b and the inner peripheral side of the second welding surface 40d. In other words, the second facing surface 40c is formed between the abutting portion 40b and the inner peripheral side of the second welding surface 40d in the distal end portion of the extending portion 42 described above. The second facing surface 40c is formed so as not to be recessed toward the second abutting surface 10a side in the axial direction, that is, the inner side of the fixed and supported portion 45. The second facing surface 40c is formed so that a minimum thickness D1 is less than a minimum thickness D2. The minimum thickness D1 is the thickness in the axial direction, of a part in which the first facing surface 10c of the flange portion 11 is formed. The minimum thickness D2 is the thickness in the axial direction, of a part in which the second facing surface 40c of the fixed and supported portion 45 is formed.

The second welding surface 40d is formed in the distal end portion of the extending portion 42. The second welding surface 40d is formed so as to extend along an entire circumference in the circumferential direction and face in the radial direction. That is, the second welding surface 40d is formed so as to extend inclined with respect to the radial direction that is perpendicular to the axial direction, and so that the surface faces the inner peripheral side. The second welding surface 40d is positioned so as to face the first welding surface 10d of the differential case 10 described above. In other words, the extending portion 42 of the fixed and supported portion 45 is extended toward the flange portion 11 in the axial direction, and the second welding surface 40d of the distal end of the extending portion 42 is formed as a facing portion that is disposed so as to face the flange portion. That is, the second welding surface 40d is disposed on the outer periphery of the second abutting surface 40a and the abutting portion 40b. The second welding surface 40d is disposed so that the second welding surface 40d can be welded with the flange portion 11 while bypassing an abutting part between the first abutting surface 10a and the second abutting surface 40a and an abutting part between the restricting portion 10b and the abutting portion 40b.

The second welding surface 40d is formed so as to include a second planar portion 40f, a second bent portion 40e, and a second end portion planar surface 40g. The second planar portion 40f has a planar shape and is provided on the upstream side of the second welding surface 40d in the irradiating direction of the laser described below, that is, on the outer peripheral side of the second welding surface 40*d*. The second bent portion 40*e* is provided on the downstream side of the second planar portion 40*f* in the irradiating direction of the laser, that is, on the inner peripheral side of the second planar portion 40*f*, and is bent in the radial direction that is perpendicular to the axial direction with respect to the second planar portion 40*f*. The second end portion planar surface 40*g* is provided on the inner peripheral side of the second bent portion 40*e* and extends in a planar shape in the radial direction that is perpendicular to the axial direction. The second end portion planar surface 40*g* forms an end portion on the inner peripheral side of the second welding surface 40*d*.

The first welding surface 10*d* and the second welding surface 40*d* that are formed as described above form a separation portion 60 in which the first welding surface 10*d* and the second welding surface 40*d* are spaced away from each other in the axial direction when the differential case 10 and the differential ring gear 40 are assembled. In the separation portion 60 a non-linear portion 80 that has a non-linear shape from the upstream side to the downstream side in the irradiating direction of the laser in a section passing through the center CTD is formed, so that the laser cannot pass through due to the first bent portion 10*e* and the second bent portion 40*e*. In this way, when the laser is irradiated, the laser is prevented from hitting the void 50, specifically the second facing surface 40*c*. As a matter of course, the laser does not hit the first abutting surface 10*a* and the second abutting surface 40*a*.

As shown in FIG. 3, when the differential case 10 and the differential ring gear 40 are assembled, in the separation portion 60, a virtual line L3 that extends from the first planar portion 10*f* and a virtual line L2 that extends from the second planar portion 40*f* are inclined at an angle θ1 and an angle θ2, respectively, with respect to an intermediate line L1. That is, the first planar portion 10*f* and the second planar portion 40*f* open towards the outer peripheral side at an angle acquired by adding the angle θ1 and the angle θ2. The first planar portion 10*f* and the second planar portion 40*f* are formed so that a distance d2 is larger than a distance d1. Here, the distance d1 is a distance on the downstream side in the irradiating direction of the laser, and is the distance over which the first planar portion 10*f* and the second planar portion 40*f* are spaced away from each other at the non-linear portion 80. The distance d2 is a distance on the upstream side in the irradiating direction of the laser, and is the distance over which the first planar portion 10*f* and the second planar portion 40*f* are spaced away from each other. The angle θ1 and the angle θ2 are set at a maximum angle of a manufacturing error when forming the first planar portion 10*f* or the second planar portion 40*f*. For example, when the maximum angle of the manufacturing error is one degree and the first planar portion 10*f* and the second planar portion 40*f* come closer to each other by one degree each, the first planar portion 10*f* and the second planar portion 40*f* become parallel to each other. This prevents the outer peripheral side from becoming narrower than the inner peripheral side in the separation portion 60.

[Manufacturing Process of Differential Device]

A manufacturing process of the differential device 1 will be described with reference to FIGS. 2 to 6. As illustrated in FIG. 6, the flange portion 11 is formed as the differential case 10 and is then machined to the shapes of the first abutting surface 10*a*, the restricting portion 10*b*, the first facing surface 10*c*, and the first welding surface 10*d* etc. The differential case 10 illustrated in FIG. 2 that has the shapes described above is thus formed (S1, differential case forming step). The tooth portion 43, the coupling portion 44, and the fixed and supported portion 45 having the extending portion 42 are formed as the differential ring gear 40 and are then machined to the shapes of the tooth surface 41, the second abutting surface 40*a*, the abutting portion 40*b*, the second facing surface 40*c*, and the second welding surface 40*d* etc. The differential ring gear 40 illustrated in FIG. 2 that has the shapes described above is thus formed (S2, differential ring gear forming step).

The second abutting surface 40*a* of the differential ring gear 40 is then press fitted to the first abutting surface 10*a* of the differential case 10 in the axial direction indicated by an arrow A in FIG. 2. The abutting portion 40*b* is then abutted against the restricting portion 10*b* and relative positions of the differential case 10 and the differential ring gear 40 are determined in the axial direction. As illustrated in FIG. 2, the separation portion 60 including the non-linear portion 80 is formed between the first welding surface 10*d* and the second welding surface 40*d*. The void 50 is provided on the inner peripheral side of the separation portion 60 so as to be in communication with the separation portion 60 and is formed between the first facing surface 10*c* and the second facing surface 40*c* and so that the void 50 is on the inner peripheral side of the extending portion 42 (S3, assembling step).

As illustrated in FIG. 4, while inserting a filler wire serving as a filler material in the separation portion 60, an irradiator 90 is provided on the outer peripheral side of the separation portion 60 and is set so that the intermediate line L1 between the first planar portion 10*f* and the second planar portion 40*f* (see FIG. 3) is in parallel with an axial line of a laser 90L serving as an energy beam. The laser 90L is irradiated so as to pass through between the first planar portion 10*f* and the second planar portion 40*f* and hit the non-linear portion 80. The irradiator 90 or the differential case 10 and the differential ring gear 40 are rotated in the circumferential direction while the separation portion 60 is welded along the entire circumference (S4, welding step).

In this way, as illustrated in FIG. 5, the separation portion 60 is filled with the filler material while the vicinity of the first welding surface 10*d* and the second welding surface 40*d* are melted. The welding portion 70 is formed and the differential case 10 and the differential ring gear 40 are integrally fixed. In this way, the welding portion 70 that is formed by welding the flange portion 11 of the differential case 10 and the fixed and supported portion 45 of the differential ring gear 40 is disposed at a position that is different from the abutting part between the first abutting surface 10*a* and the second abutting surface 40*a*, and the abutting part between the restricting portion 10*b* and the abutting portion 40*b*.

In the separation portion 60, the non-linear portion 80 is provided in a deep end of the separation portion 60, that is, near an outlet of the separation portion 60 that is on the downstream side in the irradiating direction of the laser. Thus, the entire separation portion 60 is surely overheated by the laser 90L without the laser 90L passing through the separation portion 60 and causing underheating, and it is thus possible to perform welding to the deep end of the separation portion 60.

When welding is performed, a gas is generated due to welding. However, the gas passes through the separation portion 60 into the void 50 and the gas passes through the separation portion 60 that has not been welded yet to escape outside. The gas is thus prevented from dissolving in the welding portion and the welding quality is improved. Since the separation portion 60 is welded along the entire circumference, a part of the gas that is generated last during welding is left in the void 50. However, a pressure load is not generated by the gas that slightly remains in the void 50. This is because the distance between the first facing surface 10c and the second facing surface 40c of the void 50 in the axial direction is larger than the distance of the separation portion 60 in the axial direction. That is, this is because a volume of the void 50 is overwhelmingly larger than a volume of the separation portion 60.

After welding is performed, solidification contraction occurs in conjunction with the welding portion 70 being cooled. However, as illustrated in FIG. 2, the thickness D2 is larger than the thickness D1. Here, the thickness D2 is the minimum thickness in the axial direction, of the part in which the second facing surface 40c of the fixed and supported portion 45 of the differential ring gear 40 is formed. The thickness D1 is the minimum thickness in the axial direction, of the part in which the first facing surface 10c of the flange portion 11 of the differential case 10 is formed. That is, the flange portion 11 has a lower rigidity than the fixed and supported portion 45, the flange portion 11 is deformed toward the differential ring gear 40 side and thus, deformation of the differential ring gear 40 itself is prevented. In this way, the position accuracy of the differential ring gear 40 after welding is performed can be maintained satisfactorily, and it is possible to prevent the gear noise from increasing.

When the welding of the differential case 10 and the differential ring gear 40 is completed, the two pinion gears 17 and the side gears 15, 16 are inserted in the differential case 10, the pinion shaft 18 is inserted in the pinion gears 17, and the pin 19 is inserted so as to retain the pinion shaft 18 (see FIG. 1), that is, the differential mechanism 14 described above is installed in the differential case 10 (S5). In this way, the differential device 1 is completed. The differential device 1 is installed in the automatic transmission not shown (S6) and thus, the automatic transmission is completed.

Japanese Patent No. 5614054 (JP 5614054 B) discloses a differential device in which a differential ring gear formed of a bevel gear is fitted to a differential case from an axial direction so as to be abutted against the differential case. Recessed portions are provided on each inner peripheral side of an abutting portion of the differential ring gear and an abutting portion of the differential case so as to form a through space for welding by a passing-through energy beam. The differential ring gear is made to follow the solidification contraction after welding so as to suppress weld cracks from being generated.

However, in differential device of JP 5614054 B, the differential ring gear is formed to be short in a radial direction so that a tooth portion and a welding portion overlap in the radial direction when viewed in the axial direction. The differential device of JP 5614054 B is unlike the differential ring gear 40 according to the embodiment that has the coupling portion 44 and in which the distance in the inner/outer peripheral direction is long. In the differential device of JP 5614054 B, the distance between the tooth portion and a fitting surface of the differential ring gear and the differential case is short. Here, the fitting surface serves as a fulcrum when solidification contraction occurs due to welding. The differential device of JP 5614054 B does not have a problem in which the differential ring gear that is long in the radial direction is easily inclined due to solidification contraction.

In other words, the differential device of JP 5614054 B reduces inclination resulting from solidification contraction with the rigidity of the differential ring gear. JP 5614054 B does not disclose a configuration in which a position different from the abutting part between the first abutting surface 10a and the second abutting surface 40a and the abutting part between the restricting portion 10b and the abutting portion 40b is welded so as to suppress inclination of the differential ring gear 40 that is long in the inner/outer peripheral direction (radial direction), as it is indicated by the differential device 1 according to the embodiment. JP 5614054 B also does not disclose the operation and effects as of the differential device 1 according to the embodiment. Since in the differential device of JP 5614054, the differential ring gear follows and moves as a result of solidification contraction due to welding, it can be said that the position accuracy of the differential ring gear is not satisfactory.

Summary of Embodiments

As described above, a differential device (1) includes:
a differential case (10) that houses a differential mechanism (14) that is drivingly coupled to an output shaft; and
a differential ring gear (40) that has a tooth portion (43) provided with a tooth surface (41) on an outer peripheral side, a fixed and supported portion (45) that is disposed on an inner peripheral side of the tooth portion (43) and that is fixed to and supported by an outer peripheral side of the differential case (10), a coupling portion (44) that is formed so as to have a plate shape having a thickness that is shorter than a length of the tooth portion (43) in an axial direction and that couples the tooth portion (43) and the fixed and supported portion (45), the differential ring gear (40) being welded on the outer peripheral side of the differential case (10), wherein
the differential case (10) includes:
a first abutting surface (10a) that is disposed so as to extend in the axial direction;
a restricting portion (10b) that restricts movement of the differential ring gear (40) abutted against the first abutting surface (10a) toward one side in the axial direction; and
a flange portion (11) that extends in a flange shape on an opposite side of the first abutting surface (10a) from the restricting portion (10b) in the axial direction toward the outer peripheral side,
the differential ring gear (40) includes:
a second abutting surface (40a) that is disposed on an inner peripheral side of the fixed and supported portion (45) and that is abutted against the first abutting surface (10a) in the axial direction; and
an abutting portion (40b) that is disposed on a side of the fixed and supported portion, that is extended in a radial direction, and that is configured to be abutted against the restricting portion (10b), and
a welding portion (70) that is formed by welding the flange portion (11) of the differential case (10) and the fixed and supported portion (45) of the differential ring gear (40) is disposed at a position that is different from an abutting part between the first abutting surface (10a) and the second abutting surface (40a) and an abutting part between the restricting portion (10b) and the abutting portion (40b).

A distance in an inner/outer peripheral direction of the differential ring gear 40 is long in the differential device, in which the tooth portion 43 of the differential ring gear 40 and the fixed and supported portion 45 are coupled via the coupling portion 44. However, the flange portion 11 of the differential case 10 and the fixed and supported portion 45 of the differential ring gear 40 are welded at the position that is different from the abutting part between the first abutting surface 10a and the second abutting surface 40a and the abutting part between the restricting portion 10b and the abutting portion 40b. When solidification contraction occurs after welding, it is thus possible to suppress, by the deformation of the flange portion 11, the differential ring gear 40 from being inclined. It is also possible to satisfactorily maintain the position accuracy of the differential ring gear 40 after welding and therefore prevent the gear noise from increasing.

In the differential device (1),
the differential case (10) has a first welding surface (10d) that is formed along an entire circumference so as to face the radial direction and that is formed on a distal end of the flange portion (11),
the differential ring gear (40) has a second welding surface (40d) that is formed along an entire circumference so as to face the radial direction and that is formed on the fixed and supported portion (45) so as to face the first welding surface (10d), and
a side surface (10c) of the flange portion (11) on the differential ring gear (40) side is formed so that the side surface (10c) is recessed in the axial direction from an end portion of the first welding surface (10d) on the differential ring gear (40) side in the axial direction and so that a void (50) is formed between the flange portion (11) and the fixed and supported portion (45).

In this way, since the first facing surface 10c of the differential case 10 is formed so as to be retracted to the inner side of the flange portion 11, it is possible to define the void 50 between the flange portion 11 and the fixed and supported portion 45. During welding, gas passes into the void 50 and it is possible to prevent gas from dissolving in the welding portion 70, and it is thus possible to improve welding quality.

In the differential device (1), a minimum thickness (D1) of the flange portion (11) in the axial direction is less than a minimum thickness (D2) of the fixed and supported portion (45) in the axial direction.

The differential device can thus be configured such that the flange portion 11 is easily deformed when solidification contraction occurs after welding, by setting the strength of the flange portion 11 of the differential case 10 to be relatively lower than the strength of the differential ring gear 40. It is possible to satisfactorily maintain the position accuracy of the differential ring gear 40 after welding, and thus prevent the gear noise from increasing.

In the differential device (1),
the abutting portion (40b) is formed by a part of a side face (45a) of the fixed and supported portion (45), and
the void (50) is formed between the flange portion (11) and the side face (45a) of the fixed and supported portion (45) besides the abutting portion (40b).

It is thus unnecessary to form the abutting portion 40b on the fixed and supported portion 45.

In the differential device (1), the restricting portion (10b) has a stepped shape that is extended from the first abutting surface (10a) in the radial direction.

It is thus possible to easily form a shape in which the differential ring gear 40 is positioned in the axial direction with respect to the differential case 10.

In the differential device (1),
the fixed and supported portion (45) has an extending portion (42) that is extended from the side face (45a) of the fixed and supported portion (45) in the axial direction,
the second welding surface (40d) is formed on a distal end of the extending portion (42), and
the void (50) is formed on an inner peripheral side of the extending portion (42).

With the extending portion 42, the thickness of the differential ring gear 40 in the axial direction can be increased in the second welding surface 40d. It is thus possible to increase the strength of the differential ring gear 40 and relatively improve the strength of the differential ring gear 40 by the flange portion 11. The flange portion 11 can therefore be easily deformed by solidification contraction after welding. Since the extending portion 42 is extended in the axial direction toward to the flange portion 11 side, it is possible to ensure space to define the void 50.

In the differential device (1),
the tooth surface (41) of the differential ring gear (40) is disposed so that the center of the tooth surface (41) in the axial direction overlaps in the axial direction with the second abutting surface (40a) when viewed in the radial direction, and
the first abutting surface (10a) is fitted to the second abutting surface (40a) by press fitting.

Even if a thrust force in the axial direction acts on the tooth surface 41 provided with a helical gear, a reaction force of the second abutting surface 40a in a radially outward direction and a reaction force in a radially inward direction that acts due to a thrust force of the differential ring gear 40 are acting in opposite directions. The attitude of the differential ring gear 40 thus becomes stable and the differential ring gear 40 can be accurately supported by the second abutting surface 40a. It is therefore possible to suppress the differential ring gear 40 from being inclined and prevent the gear noise from increasing.

Other Possible Embodiments

In the embodiment described above, the stepped restricting portion 10b is provided in the differential case 10 and the abutting portion 40b of the differential ring gear 40 is abutted so as to determine the relative positions of the differential case 10 and the differential ring gear 40 in the axial direction. However, the configuration is not limited to this. For example, the method of determining the relative positions in the axial direction may be any method, such as fixing with a jig or providing a key and a key groove as a means of determining positions.

In the embodiment, the configuration in which the first welding surface 10d and the second welding surface 40d are inclined with respect to the radial direction that is perpendicular to the axial direction is described. This is for avoiding interference of the irradiator 90 of the laser and the differential ring gear 40. If interference resulting from the shape of the differential ring gear 40 or the differential case 10 does not occur, the first welding surface 10d and the second welding surface 40d may be disposed along the radial direction that is perpendicular to the axial direction.

In the embodiment, the case in which a laser is used as the energy beam is described. However, the beam is not limited to this. The beam maybe any beam that can irradiate a high-energy beam and perform welding, such as an electron beam.

In the embodiment, the case in which the non-linear portion 80 provided in the separation portion 60 is formed by the first bent portion 10e and the second bent portion 40e is described. However, the non-linear portion 80 is not limited to this. The non-linear portion 80 may have a curved shape or a labyrinth shape in the section view, that is, the non-linear portion 80 only needs to have a non-linear shape in which the energy beam does not pass through.

In the embodiment, the first facing surface 10c that has an arc concave shape is described. However, the first facing surface 10c is not limited to this, and may have any shape as long as the thickness of the flange portion 11 can be decreased. The second facing surface 40c that uses a part of the side face 45a of the fixed and supported portion 45, that is, the second facing surface 40c that has a planar shape extending in the radial direction is described. However, the shape of the second facing surface 40c is not limited to this. The second facing surface 40c may have a shape that is expanded to the flange portion 11 side. That is, the second facing surface 40c only needs to have a shape in which the rigidity in the axial direction of the fixed and supported portion 45 is stronger than the rigidity in the axial direction of the flange portion 11.

In the embodiment, the differential ring gear 40 described has the tooth portion 43 provided with the tooth surface, the coupling portion 44, and the fixed and supported portion 45, and the inner peripheral side of the fixed and supported portion 45 is set as the second abutting surface 40a. However, the differential ring gear 40 is not limited to this, and the second abutting surface may be provided directly on the inner peripheral side of the coupling portion 44.

The differential device 1 according to the embodiment that is suitable for a FF type vehicle is described. However, the differential device 1 is not limited to this, and may be a differential device that is provided in a FR (front engine, rear drive) type vehicle in which the output shaft is placed longitudinally with respect to the vehicle traveling direction, and that is connected to a propeller shaft that is connected to the automatic transmission. In addition, the differential device 1 may be a differential device that is a so-called center differential device that distributes a rotation of the engine to front and rear wheels in a four-wheel-drive vehicle.

In the embodiment, the differential device installed in the automatic transmission that shifts the rotation of the engine is described. However, the differential device is not limited to this, and can be installed in a hybrid vehicle in which an engine and a motor-generator are installed or an electric vehicle in which only a motor-generator is installed.

In the embodiment, the differential mechanism that includes the pinion gear and the pair of side gears is described. However, the differential mechanism is not limited to this, and only needs to be a mechanism that absorbs a differential rotation of a pair of output shafts with a friction plate, a screw, and a one-way clutch etc. That is, the differential mechanism may have any structure.

In the embodiment, the differential case 10 that is an integrated case and in which the differential mechanism 14 is installed from the opening portion not shown is described. However, the differential case is not limited to this, and may be configured of two parts, namely a case body and a cover, and is integrated as a differential case by welding etc. after the differential mechanism is installed.

INDUSTRIAL APPLICABILITY

The differential device can be used for a vehicular transmission device such as an automatic transmission or a hybrid drive device, and is preferably used when position accuracy of the differential ring gear needs to be improved.

DESCRIPTION OF THE REFERENCE NUMERALS

1 . . . Differential device
10 . . . Differential case
10a . . . First abutting surface
10b . . . Restricting portion
10c . . . Side surface (first facing surface)
10d . . . First welding surface
11 . . . Flange portion
14 . . . Differential mechanism
40 . . . Differential ring gear
40a . . . Second abutting surface
40b . . . Abutting portion
40d . . . Second welding surface
41 . . . Tooth surface
42 . . . Extending portion
43 . . . Tooth portion
44 . . . Coupling portion
45 . . . Fixed and supported portion
45a . . . Side face
50 . . . Void
70 . . . Welding portion
D1 . . . Thickness
D2 . . . Thickness

The invention claimed is:

1. A differential device comprising:
a differential case that houses a differential mechanism that is drivingly coupled to an output shaft; and
a differential ring gear that has a tooth portion provided with a tooth surface on an outer peripheral side, a fixed and supported portion that is disposed on an inner peripheral side of the tooth portion and that is fixed to and supported by an outer peripheral side of the differential case, a coupling portion that is formed so as to have a plate shape having a thickness that is shorter than a length of the tooth portion in an axial direction and that couples the tooth portion and the fixed and supported portion, the differential ring gear being welded on the outer peripheral side of the differential case, wherein
the differential case includes:
a first abutting surface that is disposed so as to extend in the axial direction;
a restricting portion that restricts movement of the differential ring gear abutted against the first abutting surface toward one side in the axial direction; and
a flange portion that extends in a flange shape on an opposite side of the first abutting surface from the restricting portion in the axial direction toward the outer peripheral side of the differential case,
the differential ring gear includes:
a second abutting surface that is disposed on an inner peripheral side of the fixed and supported portion and that is abutted against the first abutting surface in the axial direction; and
an abutting portion that is disposed on a side of the fixed and supported portion, that is extended in a radial direction, and that is configured to be abutted against the restricting portion, and
a welding portion that is formed by welding the flange portion of the differential case and the fixed and supported portion of the differential ring gear is disposed at a position that is different from an abutting part between the first abutting surface and the second abutting surface and an abutting part between the restricting portion and the abutting portion, the welding portion extending at an angle to both the axial direction and the radial direction, wherein
the differential case has a first welding surface that is formed along an entire circumference so as to face the radial direction and that is formed on a distal end of the flange portion,
the differential ring gear has a second welding surface that is formed along an entire circumference so as to face the radial direction and that is formed on the fixed and supported portion so as to face the first welding surface,
a side surface of the flange portion on a differential ring gear side is formed so that the side surface is recessed in the axial direction from an end portion of the first welding surface on the differential ring gear side in the axial direction and so that a void is formed between the flange portion and the fixed and supported portion, the welding portion extending at the angle to both the axial direction and the radial direction, and the welding portion overlaps with the tooth surface in the axial direction as viewed from the radial direction, and
the void is radially nested within the first welding surface.

2. The differential device according to claim 1, wherein a minimum thickness of the flange portion in the axial direction is less than a minimum thickness of the fixed and supported portion in the axial direction.

3. The differential device according to claim 1, wherein the abutting portion is formed by a part of a side face of the fixed and supported portion and the void is formed between the flange portion and the side face of the fixed and supported portion besides the abutting portion.

4. The differential device according to claim 3, wherein the restricting portion has a stepped shape that is extended from the first abutting surface in the radial direction.

5. The differential device according to claim 1, wherein
the fixed and supported portion has an extending portion that is extended from a side face of the fixed and supported portion in the axial direction,
the second welding surface is formed on a distal end of the extending portion, and
the void is formed on an inner peripheral side of the extending portion.

6. The differential device according to claim 1, wherein
the tooth surface of the differential ring gear is disposed so that a center of the tooth surface in the axial direction overlaps in the axial direction with the second abutting surface when viewed in the radial direction, and
the first abutting surface is fitted to the second abutting surface by press fitting.

* * * * *